United States Patent [19]

Blum et al.

[11] Patent Number: 4,525,570

[45] Date of Patent: Jun. 25, 1985

[54] HEAT-SETTING MIXTURES WHICH HAVE A LONG SHELF LIFE AND COMPRISE A POLYISOCYANATE AND COMPOUNDS WHICH ARE REACTIVE TOWARD ISOCYANATE GROUPS, AND THEIR PREPARATION

[75] Inventors: Rainer Blum, Ludwigshafen; Herbert Spoor, Limburgerhof; Rolf Osterloh, Gruenstadt; Gerhard Mosler; Bernhard Rubbert, both of Muenster, all of Fed. Rep. of Germany

[73] Assignee: BASF Aktiengesellschaft, Fed. Rep. of Germany

[21] Appl. No.: 518,002

[22] Filed: Jul. 28, 1983

[30] Foreign Application Priority Data

Jul. 31, 1982 [DE] Fed. Rep. of Germany ....... 3228723

[51] Int. Cl.[3] .................... C08G 18/72; C08G 18/48; C08G 18/62
[52] U.S. Cl. ....................................... 528/75; 528/45; 528/73; 528/902; 528/44; 528/85
[58] Field of Search .................... 528/45, 902, 75, 73; 252/188.31

[56] References Cited

U.S. PATENT DOCUMENTS

| | | | |
|---|---|---|---|
| 3,409,461 | 11/1968 | Mehlo | 117/100 |
| 3,457,200 | 10/1969 | Kallert et al. | 117/94 |
| 3,655,627 | 4/1972 | Hutzler et al. | 528/902 |
| 4,029,626 | 6/1977 | Gillemot et al. | 260/31.6 |
| 4,068,086 | 1/1978 | Dalibor | 560/169 |
| 4,070,346 | 1/1978 | Schnoering et al. | 528/902 |
| 4,251,427 | 2/1981 | Recker et al. | 524/789 |
| 4,400,497 | 8/1983 | Blum et al. | 528/45 |

FOREIGN PATENT DOCUMENTS

| | | |
|---|---|---|
| 1570548 | 8/1969 | Fed. Rep. of Germany . |
| 1720856 | 7/1971 | Fed. Rep. of Germany . |
| 2640295 | 10/1978 | Fed. Rep. of Germany . |
| 2639491 | 4/1979 | Fed. Rep. of Germany . |
| 2612638 | 7/1979 | Fed. Rep. of Germany . |
| 2842805 | 4/1980 | Fed. Rep. of Germany . |
| 1237936 | 6/1960 | France . |

OTHER PUBLICATIONS

Vieweg/Hochtlen, "Kunststoff-Handbuch", Band VII, Polyurethane, (Carl Hanser Verlag Munchen, 1966), pp. 11, et seq.

M. Hartmann, R. Dowbenko, U. T. Hockswender, *Organic Coatings and Applied Polymer Science*, vol. 46, 1982, pp. 429–432.

D. Weinmann, "Beschichtungen mit Lacken und Kunststoffen", Verlag W. A. Colomb, Stuttgart, 1967, pp. 103 et seq.

*Primary Examiner*—Herbert S. Cockeram
*Attorney, Agent, or Firm*—Keil & Weinkauf

[57] ABSTRACT

In heat-setting mixtures which have a long shelf life at room temperature and comprise a polyisocyanate and one or more compounds which are reactive toward isocyanate groups, the polyisocyanate is present, in the form of discrete particles, in a saturated or unsaturated amino-, hydrazide-, mercaptan- and/or carboxyl-containing polymer, polycondensate or polyadduct which has a functionality of more than 1 and some of which can be replaced by a polyol, and the polyisocyanate particles are deactivated at their surface so that from 0.01 to 20 equivalent percent of the total amount of isocyanate groups present is deactivated. These mixtures are useful as coating compositions, adhesives and sealant materials, particularly as undersealants for motor vehicles.

6 Claims, No Drawings

HEAT-SETTING MIXTURES WHICH HAVE A LONG SHELF LIFE AND COMPRISE A POLYISOCYANATE AND COMPOUNDS WHICH ARE REACTIVE TOWARD ISOCYANATE GROUPS, AND THEIR PREPARATION

The present invention relates to heat-setting mixtures which have a long shelf life at room temperature, can be used as coating compositions, adhesives or sealant materials or as undersealants for motor vehicles, and comprise a polyisocyanate and one or more compounds which are reactive toward isocyanate groups, the polyisocyanate being dispersed in the form of discrete particles which are deactivated at their surface, and to a process for their preparation.

The preparation of combinations of polyisocyanates with binders which contain groups which are reactive toward isocyanate groups, and their direct application, are known.

However, considerable difficulties result from the fact that the isocyanate group reacts with the envisaged reactant, eg. a polyol or a nylon, at as low as room temperature, ie. it is impossible to formulate a combination having a long shelf life.

In order to overcome this difficulty, two-component systems are frequently used. The reactants are stored in separate formulations, which are mixed only just before application; the reaction then takes place spontaneously or is accelerated by heat and/or a catalyst.

For example, such a material is described in U.S. Pat. No. 4,029,626. The disadvantages of this process are the necessity for separate formulation and storage of the two components, the difficulties in precise metering and thorough mixing before application, and the danger of blockage of the mixing apparatus and applicator as a result of premature reaction.

Another conventional method of preparing polyisocyanate materials having a long shelf life starts from non-crosslinked prepolymers which contain only a small amount of free isocyanate, atmospheric moisture serving as the crosslinking agent. This method is described in, for example, French Pat. No. 1,237,936. The disadvantage in this case is that the hardening, which begins at the surface, extends only very slowly to the deeper regions of the coating, so that the final properties are acquired only after weeks or months and, for example between large areas or in cavities, no hardening at all occurs.

Stable systems can also be formulated if the polyisocyanate is first reacted with a monofunctional reactant. The resulting adduct is referred to as a blocked isocyanate if it is less heat-stable than the product of the crosslinking reaction to be carried out subsequently. Under the action of heat, the blocking agent is eliminated, and the polyisocyanate undergoes crosslinking, forming a bond which is more heat-stable.

This principle is described in, for example, Vieweg-Höchtlen, Kunststoff-Handbuch, Volume VII, Polyurethane (Carl Hanser Verlag Munich, 1966), page 11 et seq., and also forms the basis of a number of patents, eg. German Published Application Nos. DAS 2,640,295, DAS 2,612,638 and DAS 2,639,491 and EPA 0,000,060.

Because of the eliminated blocking agent, such formulations have industrial and economic disadvantages: if the blocking agent remains in the crosslinked material it changes the properties of the latter; if it vaporizes, it has either to be recovered or to be removed from the waste air.

German Published Application No. DAS 1,570,548 and German Laid-Open Application Nos. DOS 2,842,805 and DOS 2,921,162 describe polyisocyanates which melt at above 100° C. and at above 130° C. respectively and which, with special polyols, give combinations which have long shelf lives and which can be hardened by heating to give coatings for fabrics or woven hoses.

The industrial disadvantage of the combinations described in these publications is that products having a long shelf life can be obtained only with a very small number of polyols having a special composition; therefore, these combinations are, for example, completely unsuitable for a number of uses.

It is an object of the present invention to provide liquid or pasty heat-setting mixtures which have a long shelf life and comprise a polyisocyanate and compounds which are reactive toward isocyanate groups, which do not possess the above disadvantages.

We have found that this object is achieved by heat-setting mixtures which have a long shelf life at room temperature, can be used as coating compositions, adhesives or sealant materials or as undersealants for motor vehicles, and comprise a polyisocyanate and one or more compounds which are reactive toward isocyanate groups and may or may not contain additives, such as protective colloids, solvents, plasticizers, pigments, fillers, dyes or other assistants conventionally used in surface coating technology, wherein the polyisocyanate, in the form of discrete particles having a diameter of from 0.1 to 150 µm, is dispersed in a saturated or unsaturated amino-, hydrazide-, mercaptan- and/or carboxyl-containing polymer, polycondensate or polyadduct which has a functionality of more than 1 and may or may not contain the stated additives and some of which may be replaced by polyols, and the polyisocyanate particles are deactivated at their surface, with the proviso that from 0.01 to 20 equivalent percent of the total amount of isocyanate groups present is deactivated.

The deactivation is preferably carried out using primary or secondary amines, water or compounds which contain carboxyl, phenolic hydroxyl, amide, hydrazide or alcoholic hydroxyl groups, with the proviso that the compounds containing alcoholic hydroxyl groups have a water-solubility of less than 1%.

The present invention furthermore relates to a process for the preparation of these mixtures, wherein the polyisocyanate is dispersed, in general at below 40° C., in a saturated or unsaturated amino-, hydrazide-, mercaptan- and/or carboxyl-containing polymer, polycondensate or polyadduct which has a functionality of more than 1 and some of which can be replaced by polyols, by a method in which the deactivator is already present or some or all of it is added subsequently to the dispersion of the polyisocyanate, or the polyisocyanate is first treated with the deactivator and then dispersed in the said polymer, polycondensate or polyadduct.

Suitable saturated or unsaturated amino-, hydrazide-, mercaptan- and/or carboxyl-containing polymers which have a functionality of more than 1 and some of which can be replaced by polyols are conventional products; their preparation, if it is cited below, is not claimed and does not form a subject of the present invention.

The novel mixtures are particularly useful as coating compositions, adhesives or sealant materials on metals and non-metals and in particular as undersealants for motor vehicles.

The present invention avoids the disadvantages of the prior art described above, in that the polyisocyanate is dispersed, in the form of discrete particles, in the said polymers, polycondensates or polyadducts, and the dispersed particles are deactivated at their surface by chemical reactions. Only a relatively small proportion of the isocyanate groups is used for the deactivation, so that the particles remain reactive.

During heat-setting, phase separation is inhibited by dissolving or melting processes, and crosslinking can take place.

Regarding the components of the novel mixtures, the following may be stated specifically.

Suitable polyisocyanates are the conventional aliphatic, cycloaliphatic and aromatic diisocyanates and polyisocyanates, as obtained, for example, by an addition reaction of a diisocyanate with a diol, triol or polyol, or from a diisocyanate by dimerization to a urethdione, trimerization to an isocyanurate or reaction with an amine or water to give a biuret. Examples of diisocyanates suitable for this purpose include diphenylmethane diisocyanate, toluylene diisocyanate, isophorone diisocyanate and hexamethylene diisocyanate.

Preferred polyisocyanates are those which are solid at room temperature, for example the adduct obtained from toluylene diisocyanate and trimethylolpropane, or the cyanurate obtained from 3 moles of toluylene diisocyanate, and in particular sparingly soluble pulverulent dimeric toluylene diisocyanate containing urethdione groups.

In accordance with the invention, suitable compounds which are reactive toward isocyanate groups are saturated or unsaturated amino-, hydrazide-, mercaptan- and/or carboxyl-containing polymers, polycondensates or polyadducts which have a functionality of more than 1, preferably from 2 to 4, and some of which, eg. not more than 95, preferably not more than 50, percent by weight, can be replaced by a polyol. A functionality of less than 2 or a non-integral functionality can exist if the component which is reactive toward isocyanate groups is not homogeneous and if monofunctional constituents are present.

Examples of suitable amino-containing polymers, polycondensates or polyadducts having a functionality of more than 1 are polyamines containing primary and/or secondary amino groups, for example polyamideamines which are obtained by polycondensation of dimerized linseed oil fatty acid with a divalent or trivalent amine; the amine content can be varied within a wide range by suitable choice of the amine (eg. (R)Versamide from Schering).

Polymers carrying hydrazide groups are obtained by, for example, hydrazinolysis of polyacrylates, as described by M. Hartmann, R. Dowbenko and T. Hockswender in Organic Coatings+Applied Polymer Science 46 (1982), pages 429 and 432.

Examples of suitable mercaptan-containing polymers or polycondensates or polyadducts having a functionality of more than 1 are polythiols.

In the present case, the term polythiols always means simple or complex organic compounds which possess two or more branched-chain or terminal —SH functional groups per average molecule.

Examples of such polythiols are esters of mercaptofatty acids with polyhydroxy compounds; the preparation of these is described in, for example, German Laid-Open Application No. DOS 1,720,856.

Examples of suitable carboxyl-containing polymers, polycondensates or polyadducts having a functionality of more than 1 are saturated and unsaturated polyesters prepared using an excess of acid; homopolymers and copolymers of acrylic acid and/or methacrylic acid with their esters and/or with other suitable unsaturated monomers; and acidic polymers obtained by alcoholysis of the adducts of maleic acid with unsaturated compounds, eg. polybutadiene oils or linseed oil. It is also possible to use mixtures of these amino-, hydrazide-, mercaptan- or carboxyl-containing products as well as polymers, polycondensates and polyadducts which contain different functional groups from among those mentioned, for example in order to establish desired properties, such as adhesion and resistance to chemicals.

Suitable polyols are the polyesterols, polyetherols and hydroxyl-containing polymers conventionally used in polyurethane chemistry, for example copolymers of olefinically unsaturated monomers without active hydrogen atoms and olefinically unsaturated monomers possessing active hydrogen atoms.

Examples of suitable monomers without active hydrogen atoms are vinyl-aromatics, eg. styrene or vinyltoluene, olefins, eg. ethylene or propylene, acrylates or methacrylates, eg. butyl acrylate, 2-ethylhexyl acrylate or methyl methacrylate, vinyl esters of straight-chain or branched carboxylic acids, eg. vinyl acetate, vinyl propionate or vinyl pivalate, and vinyl ethers, eg. vinyl isobutyl ether.

Examples of suitable monomers possessing hydrogen atoms which are reactive toward isocyanate groups are monoacrylates and monomethacrylates of polyhydric, in particular dihydric, alcohols, eg. butanediol monoacrylate, hydroxypropyl acrylate or hydroxypropyl methacrylate, other copolymerizable olefinically unsaturated hydroxyl-containing compounds, eg. vinylglycol, and copolymerizable olefinically unsaturated compounds containing amine and/or amide groups, eg. acrylamide and methacrylamide.

In the novel mixtures, the polyisocyanate, in the form of discrete particles having a diameter of from 0.1 to 150, preferably from 1 to 50, $\mu$m, is dispersed in the stated compounds which are reactive toward isocyanate groups, or mixtures of these compounds with polyols, and the ratio of isocyanate groups to groups which are reactive toward these is in general from 0.5:1 to 1:0.5, preferably from 0.9:1 to 1:0.9.

However, the invention is not restricted to these amounts, and for certain purposes it is also possible to deviate from them. For example, mixtures containing substantially smaller amounts of isocyanate are useful as adhesives for removable metal labels.

The dispersed polyisocyanate particles are deactivated at their surface to such an extent that they do not react with the reactive compounds at room temperature.

Advantageously, the deactivator chosen is bound to the surface of the polyisocyanate particles by means of chemical or physical forces, resulting in phase separation between the polyisocyanate particles and the compound which is reactive toward isocyanate groups or the mixture of this compound with the polyol.

To effect chemical deactivation, from 0.01 to 20, preferably from 0.3 to 5, equivalent percent of the total amount of isocyanate groups present is reacted with the deactivator.

To accelerate and control the deactivation, it is also possible to add suitable catalysts, preferably those which selectively promote the deactivation.

Suitable deactivators are water, mono- and polyamines and mono- and poly-alcohols. Particularly suitable deactivators are relatively long-chain monoamines, eg. stearylamine, which react to give a type of grafted emulsifier. Relatively high molecular weight polyamines, eg. polyamide-amines, and hydroxyl-terminated polymers, eg. hydroxyl-terminated polybutadiene oils, react to form grafted protective colloids. Other particularly suitable reactions for deactivating the isocyanate groups at the surface of the polyisocyanate particles, ie. for stabilizing the isocyanate/polyol dispersions are reactions which lead to urea or polyurea structures on the isocyanates, since these structures are insoluble in most of the polyols and organic solvents. Such urea-forming or polyurea-forming reagents are water and primary or secondary amines, short-chain diamines, eg. ethylenediamine or propylenediamine, being preferred. The polyureas formed from these short-chain diamines are more organophobic than those obtained from relatively long-chain diamines and hence have a better stabilizing effect. The preferred procedure employs sparingly soluble pulverulent dimeric toluylene diisocyanate. An isocyanate reacts substantially more rapidly with a primary amine than with a polyol, and a mixture having a long shelf life can therefore be obtained directly, for example by stirring pulverulent dimeric toluylene diisocyanate into a diamine-containing polyetherol.

An advantage of this process is that the urea structures react further with other isocyanates at elevated temperatures to form biuret structures, ie. the deactivator is incorporated into the crosslinked system and does not leave any inhomogeneity.

Other suitable deactivators are compounds which contain carboxyl, phenolic hydroxyl, amide, hydrazide or alcoholic hydroxyl groups; the compounds containing alcoholic hydroxyl groups have a water-solubility of less than 1%.

Examples of suitable carboxyl-containing deactivators are homopolymers and copolymers of acrylic acid, methacrylic acid, maleic acid and other polymerizable acids, acidic polycondensates, eg. polyesters prepared using an excess of acid, and acidic polymers obtained by alcoholysis of the adducts of maleic anhydride with unsaturated polymers, eg. linseed oil or polybutadiene oil.

Examples of suitable deactivators which contain phenolic hydroxyl groups are phenol, cresol, Cardanol, p-tert.-butylphenol, 2,2-bis-[4-hydroxyphenyl]-propane and the non-crosslinked condensates of these phenolic compounds with aldehydes, eg. formaldehyde, which are also referred to as resols.

Examples of suitable amide-containing deactivators are soluble nylons and polymers of acrylamide and methacrylamide or copolymers of acrylamide and/or methacrylamide with acrylic acid and/or methacrylates.

Further suitable compounds are polyhydrazides which are obtained by hydrazinolysis of polyacrylates and whose preparation is described by, for example, M. Hartmann, R. Dowbenko and U. T. Hockswender in Organic Coatings+Applied Polymer Science 46 (1982), pages 429 and 432.

In a particular embodiment, the mixtures may additionally contain from 0.5 to 60% of conventional plasticizers, such as esters of phthalic acid, adipic acid, sebacic acid or phosphoric acid, high-boiling hydrocarbons, chlorohydrocarbons, epoxidized natural oils or low molecular weight polyesters.

The term plasticizer is discussed in detail by D. Weinmann in Beschichtungen mit Lacken and Kunststoffen, Verlag W. A. Colomb, Stuttgart, 1967, pages 103 et seq.

For adjustment to special processing conditions or to achieve particular effects, the novel mixtures can contain, in general in the compounds which are reactive toward isocyanate groups, additives such as protective colloids, for example in an amount of from 0.1 to 15%, solvents, eg. gasolines, esters, ketones, ethers or glycolethers, pigments, eg. carbon black, titanium dioxide and organic or inorganic colored pigments, fillers, eg. talc, alumina, chalk or quartz flour, dyes or other assistants conventionally used in surface coating technology.

The novel mixtures are generally prepared using conventional dispersing and mixing units. The polyisocyanate is advantageously dispersed in the compound which is reactive toward isocyanate groups at below 40° C., preferably at from 0° to 25° C., and either the latter compound already contains the total amount of deactivator or the deactivator is added to the mixture shortly after the dispersing process. The presence of catalysts which selectively promote the reaction between the polyisocyanate and the deactivator may be advantageous.

In another possible process for preparing the novel mixtures, the polyisocyanate is first treated with the deactivator, in general at below 40° C., preferably from 0° to 25° C., and in the presence or absence of a suitable catalyst, and is then dispersed in the compound which is reactive toward isocyanate groups or in its mixture with the polyol.

The novel mixtures have a shelf life of not less than 3 months at 25° C., and no change in the material which has an adverse effect on its use according to specified conditions is observed.

The mixtures according to the invention are generally hardened at from 70° to 180° C.

The novel mixtures can be used in liquid or pasty form, and are suitable as coating compositions, adhesives and sealant materials. Suitable substrates are metals, eg. steel, aluminum, copper or magnesium, which may also be coated with a primer, and non-metals, eg. glass, ceramics, heat-resistant plastics and textiles.

The mixtures according to the invention can be particularly advantageously used as undersealants for motor vehicles.

The Examples which follow illustrate the invention without restricting it. In the Examples, parts and percentages are by weight, unless stated otherwise.

EXAMPLE 1

(A) Preparation of a hydrazide-containing polymer 430 parts of butylglycol are heated to 130° C. under a gentle stream of nitrogen in a glass polymerization reactor equipped with a reflux condenser, two feed vessels, a stirrer and a thermometer. Feed 1, consisting of 225 parts of ethylhexyl acrylate, 225 parts of methyl methacrylate, 50 parts of ethyl acrylate and 5 parts of dodecylmercaptan, is added in the course of 3 hours, and feed 2, consisting of 70 parts of butylglycol and 5 parts of t-butyl perbenzoate, is added in the course of 4 hours.

The mixture is cooled to 60° C., 25 parts of hydrazine hydroxide are added and the mixture is then heated to 130° C. in the course of one hour, and is kept at this temperature. The reflux condenser is then replaced by a descending condenser, and the temperature is increased to 160° C. 75 g of distillate are obtained. After cooling, the polymer solution is brought to a solids content of 50% with butylglycol. The resulting resin solution has an amine number of 29.3.

(B) Preparation of a heat-setting mixture which has a long shelf life and comprises a hydrazide-containing polymer and a polyetherpolyol 70 parts of a polyetherpolyol based on glycerol and propylene oxide and having an OH number of about 400 and a molecular weight of about 420, 150 parts of a polyetherdiol based on propylene oxide and having a molecular weight of about 200 and a viscosity of 320 mPa.s and 105 parts of finely divided toluylene 2,4-diisocyanate dimerized via urethdione formation are processed with a high-speed stirrer at not more than 35° C. to give a paste which is capable of flow.

The paste is then cooled to 20° C., and 0.5 part of a polyamide-amine having an amine number of about 400, 1 part of a 25% strength solution of phenyl mercury propionate in butylglycol, and 100 parts of polymer A are stirred in successively.

The resulting paste is capable of flow and solidifies in 20 minutes at 140° C. to give a tough and flexible material which exhibits good water resistance and good adhesion to clean, zinc-phosphatized or primed steel sheet. Because of these properties, the paste is useful as a seam sealant in automotive construction.

After storage for 3 months at 30° C., no change is observed either in the paste or in the quality of the seal produced from the stored paste.

EXAMPLE 2

Heat-setting mixture comprising a carboxyl-containing polymer and a polyetherpolyol 450 parts of a polyetherdiol having a molecular weight of about 1,060 and 450 parts of a polyetherdiol based on propylene oxide and having a molecular weight of about 2,000 are heated to 140° C. in a polymerization reactor equipped with a stirrer, a reflux condenser, two feed vessels and a thermometer. Feed 1, consisting of 50 parts of hydroxypropyl acrylate, 50 parts of acrylic acid, 400 parts of ethylhexyl acrylate, 400 parts of styrene and 9 parts of 2-hydroxyethylmercaptan, is added in the course of 3 hours, and feed 2, consisting of 45 parts of t-butyl perbenzoate, is added in the course of 4 hours. Polymerization is allowed to continue for a further 2 hours at 140° C., after which the mixture is cooled.

The resulting material is transferred to a planetary mixer, and 170 parts of finely powdered toluylene 2,4-diisocyanate dimerized via urethdione formation are mixed in. During this procedure, the temperature is kept at about 20° C. by cooling. When a smooth homogeneous paste is formed, 8 parts of a polyamide-amine resin having an amine number of about 200, 5 parts of dibutyl-tin dilaurate, 5 parts of diazabicyclooctane and 700 parts of finely powdered dry chalk are mixed in, mixing being continued until a smooth homogeneous paste is once again obtained.

This paste, when applied in a layer about 10 mm thick, can undergo crosslinking at from 110° to 150° C. to give a resilient and flexible foamed material which is useful as a carpet backing or as a sound-insulating composition in automotive construction.

The paste is stable for not less than 3 months at room temperature. An identical paste prepared without the addition of the polyamide-amine resin stabilizer has a shelf life of less than 1 week.

EXAMPLE 3

(A) Preparation of a polythiol 159 parts of β-mercaptopropionic acid, 650 parts of a polyethertriol based on glycerol and propylene oxide and having a molecular weight of about 2,000, 0.5 part of p-toluenesulfonic acid and 100 parts of benzene are boiled in a stirred vessel equipped with a water separator. An azeotropic benzene/water mixture is taken off, 25 parts of water being obtained. The reaction mixture is kept for several hours at 70° C. under reduced pressure. The resulting polythiol polymer has a molecular weight of about 2,210–2,230 and an average functionality of 3.

(B) Preparation of a heat-setting material which has a long shelf life and contains a polythiol 750 parts of the polythiol A are worked in a cooled laboratory kneader with 90 parts of finely powdered toluylene 2,4-diisocyanate, dimerized via urethdione groups, to give a homogeneous mixture. 1.8 parts of a polyamide-amine resin having an amine number of about 400 are added, mixing is continued for a further 20 minutes at about 20° C., and then 7.5 parts of a 33% strength solution of diazabicyclooctane in butylglycol are mixed in. The resulting paste exhibits good flow, has a shelf life of >3 months and can be converted to an elastomeric material by heating at 110°–140° C.

We claim:

1. A heat-setting mixture which has a long shelf life at room temperature, can be used as a coating composition, an adhesive or a sealant material or as an undersealant for motor vehicles, and comprises a polyisocyanate and one or more compounds which are reactive toward isocyanate groups and may or may not contain additives, such as protective colloids, solvents, plasticizers, pigments, fillers, dyes or other assistants conventionally used in surface coating technology, wherein the polyisocyanate, in the form of discrete particles having a diameter of from 0.1 to 150 μm, is dispersed in a saturated or unsaturated amino-, hydrazide-, mercaptan- and/or carboxyl-containing polymer, polycondensate or polyadduct which has a functionality of more than 1 and may or may not contain the stated additives and not more than 95% of which may be replaced by polyols, and the polyisocyanate particles are deactivated at their surface, with the proviso that from 0.01 to 20 equivalent percent of the total amount of isocyanate groups present is deactivated.

2. The mixture of claim 1, wherein the deactivation is carried out using a primary or secondary amine, water or a compound which contains carboxyl, phenolic hydroxyl, hydrazide, amide or alcoholic hydroxyl groups, with the proviso that the compound containing alcoholic hydroxyl groups has a water-solubility of less than 1%.

3. The mixture of claim 1, wherein, after deactivation of the surface of the polyisocyanate particles, the ratio of the reactive NCO groups present in the mixture to the groups which are reactive toward isocyanate is from 1:0.5 to 0.5:1.

4. A process for the preparation of the mixture set forth in claim 1, wherein the polyisocyanate is dispersed in a saturated or unsaturated amino-, mercaptan- and/or carboxyl-containing polymer, polycondensate or polyadduct which has a functionality of more than 1 and some of which can be replaced by a polyol, wherein the deactivator is either already present or in which some of it is present and the balance is added subsequently or all of it is added subsequently to the dispersion of the polyisocyanate.

5. A process for the preparation of the mixture set forth in claim 1, wherein the polyisocyanate is first treated with a deactivator and then dispersed in a saturated or unsaturated amino-, mercaptan- or carboxyl-containing polymer, polycondensate or polyadduct which has a functionality of more than 1 and some or all of which can be replaced by a polyol.

6. The mixture of claim 1, wherein not more than 50% of the amino-, hydrazide-, mercaptan- and/or carboxyl-containing polymer, polycondensate or polyadduct may be replaced by polyols.

* * * * *